March 16, 1971 — D. W. STEPHENSON — 3,570,060
GAUGE CONTROL FOR PRODUCTS FROM PRESSES
Filed May 6, 1969
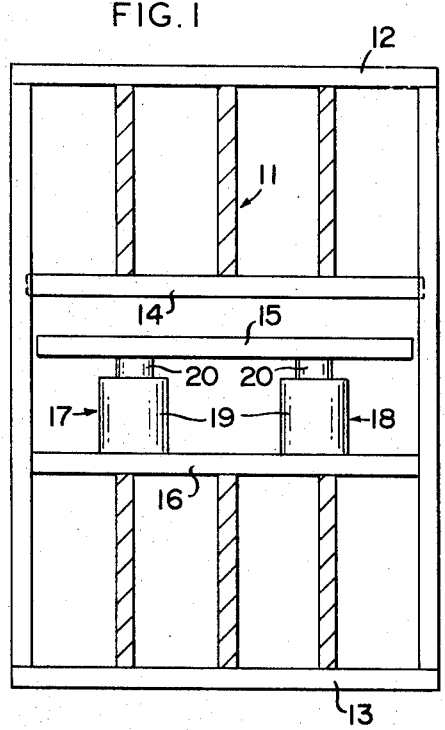
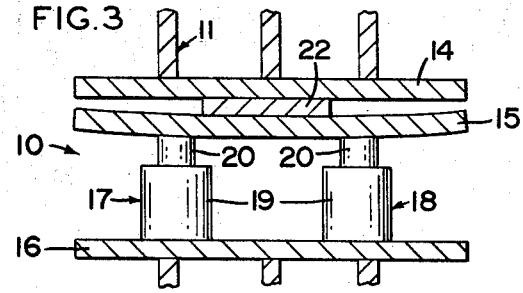
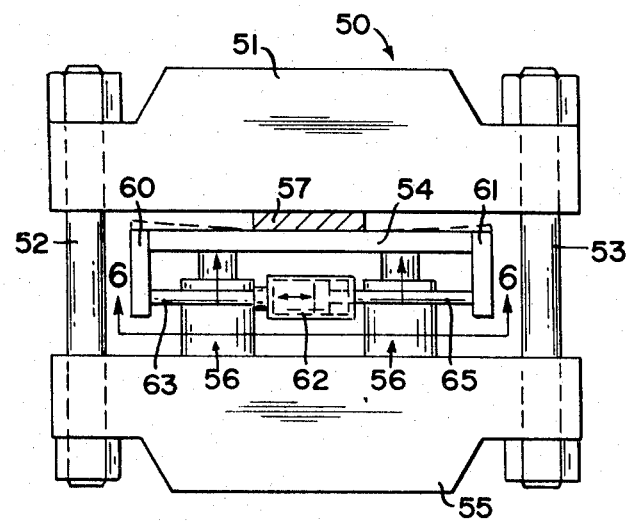
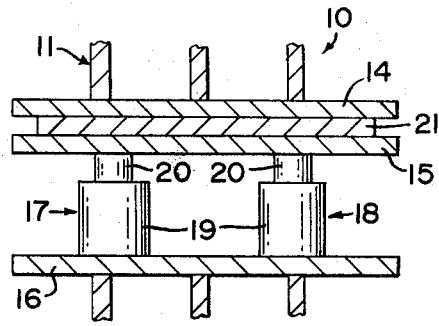
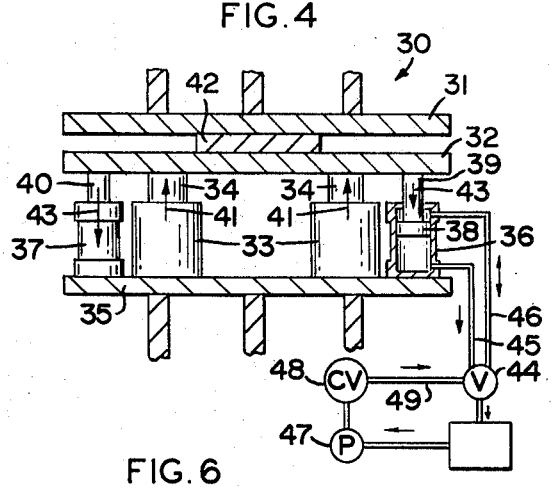
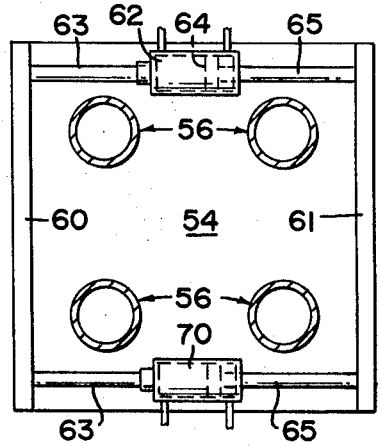
INVENTOR.
DANIEL W. STEPHENSON
BY
Oldham & Oldham
ATTORNEYS.

United States Patent Office 3,570,060
Patented Mar. 16, 1971

3,570,060
GAUGE CONTROL FOR PRODUCTS FROM PRESSES
Daniel W. Stephenson, Cuyahoga Falls, Ohio, assignor to Adamson United Company, Akron, Ohio
Filed May 6, 1969, Ser. No. 822,269
Int. Cl. B30b 11/00, 15/16
U.S. Cl. 18—16    5 Claims

ABSTRACT OF THE DISCLOSURE

This invention relates to hydraulic presses and particularly to apparatus for controlling gauge of products produced in presses including a fixed bolster, and a movable bolster operatively positioned in the press frame for movement to and from association with the fixed bolster for forming a product therebetween. A pair of hydraulic piston and cylinder means operatively connect the movable bolster and the frame at corresponding positions adjacent each end of the movable bolster whereby pressures exerted by such piston and cylinder means can bend end portions of the movable bolster reversely to any bending action created therein by pressure closing action of the movable bolster whereby the gauge of the product produced between the bolsters can be controlled.

---

The present invention particularly relates to hydraulic presses and to improved gauge control apparatus associated with such presses for maintaining a movable bolster or platen in parallel operative association with a fixed bolster in the press to provide uniform thickness articles formed between the bolsters.

BACKGROUND OF THE INVENTION

In the past, various types of article forming presses have been made and quite a few presses are in use today adapted to make or mold a variety of flat sheet products, or articles wherein the articles are molded or cured in the press. Such products may comprise substances such as asbestos-cement sheets, industrial laminates, wood-product sheets, mats, or other similar articles requiring some compression and/or curing action in the shaping, molding and/or curing thereof. Such presses are adapted to form relatively elongate sheets as the usual products. However, sometimes the length of the sheets to be produced in the press may vary whereby relatively small sheets are to be produced in a given press having a relatively elongate bolster or platen therein. In such instances, there has been a tendency for the movable flat surfaced bolsters or platens in the press to be bent at their ends out of a true flat or planar shape where high bolster pressures are applied to the article being produced in the press.

Efforts have been made heretofore to avoid any undesired bowing or curvature in press bolsters by increasing the strength or thickness of the bolsters but such reinforced bolsters are relatively expensive to produce, are bulky and costly to handle, produce and to install.

It is the general object of the present invention to provide a novel and improved hydraulic press with product gauge control means or apparatus therein and wherein such gauge control apparatus may comprise pressure means engaging opposed end portions of a movable bolster in a press and applying reverse curvature biasing forces thereto in relation to any bowing tendency of the bolster when in operation.

Another object of the invention is to provide improvements in hydraulic molding and curing presses particularly designed for forming elongate articles therein by curing or pressing operations whereby such press can be used for forming any desired length of an article therein without impairing the quality and uniformity of gauge of the article produced.

Another object of the invention is to provide controllable pressure means in molding presses of the type described wherein such pressure means are adapted to set up biasing forces in a movable bolster to maintain it in a planar condition under other than normal article forming conditions.

Another object of the invention is to provide a hydraulic cylinder and piston means, or equivalent, operatively engaged with and extending between end portions of a bolster in a hydraulic press for exerting biasing forces on the bolster to oppose bending thereof by the bolster moving and closing pressure means in the press.

The foregoing and other objects and advantages of the present invention will be made more apparent as the specification proceeds.

INVENTIVE SUBJECT MATTER

Generally speaking, the improved product gauge control apparatus in a hydraulic press of the invention is adapted to be used with a substantially conventional hydraulic press including frame means, a fixed bolster extending transversely of the frame means, a movable bolster, and hydraulic ram means engaging the movable bolster to move it to and from operative pressure engagement with the fixed bolster. The gauge control means includes, as one embodiment thereof, a pair of hydraulic piston and cylinder means operatively connected between the movable bolster and the frame at corresponding positions adjacent each end of such movable bolster, which piston and cylinder means engages the movable bolster under controllable pressures to produce bending stresses therein biasing end portions of the movable bolster away from the fixed bolster.

Reference now is made to the accompanying drawings, wherein:

FIG. 1 is a side elevation, partially broken away and shown in section, of a typical hydraulic press;

FIG. 2 is a fragmentary vertical section through the article forming portion of the press of FIG. 1, with an article being processed being indicated therein;

FIG. 3 is a fragmentary vertical section of the press of FIG. 1, and corresponding to FIG. 2, but wherein a relatively short article is being produced in the press and showing in somewhat exaggerated form a bowing tendency in the movable bolster;

FIG. 4 is a fragmentary vertical section of a press as in FIG. 3, but modified and having a gauge control apparatus of the invention associated with such press;

FIG. 5 is an elevation of a press forming a modification of the press and product gauge control means of the invention; and FIG. 6 is a fragmentary horizontal section taken on line 6—6 of FIG. 5.

When referring to corresponding members shown in the drawings and referred to in the specification, corresponding numerals are used to facilitate comparison therebetween.

The details of the structures shown in the drawings include a substantially conventional hydraulic press indicated as a whole by the numeral 10. This hydraulic press 10 is shown to have a plate-type frame 11 provided therefor and is illustrated as having a top plate 12 and a bottom plate 13 forming portions of the frame for the hydraulic press 10. The press 10 is shown as having a transversely extending flat surfaced top bolster 14 suitably fixedly secured to components of the frame 11 while a flat movable bolster, platen or the like 15 is operably positioned in the hydraulic press immediately adjacent and below the top bolster 14, A support plate 16 is also provided in this hydraulic press 10 and it is used for supporting a pair of conventional hydraulic ram means indicated at 17 and 18 in the drawings. Such hydraulic ram means include cylinders 19 and individual rams 20 operably engaging the cylinders 19 and extending therefrom for positioning the movable bolster 15. Any conventional source of hydraulic pressure is connected to the cylinders 19 in conventional manners whereby pressure liquid can be supplied to the cylinder for moving the rams vertically upwardly in the apparatus as shown, or for permitting or forcing the rams to retract, when desired. The rams 20 are operably connected to the bottom portion of the movable bolster 15 in any suitable manner.

While the press 10 is shown as having vertically upward movement of the movable bolster 15, obviously the fixed or top bolster 14 could be positioned at the lower portion of the apparatus and the movable bolster be above the fixed bolster when desired.

In all events, the hydraulic press 10 is adapted to move the movable bolster 15 into pressurized engagement with a sheet or layer of material 21 which is positioned on the movable bolster 15 and then is adapted to be pressed into engagement with the top bolster 14 as indicated in FIG. 2 for article forming action. Obviously, the top bolster 14 and movable bolster 15 may be provided with any conventional means thereon, such as heating elements or the like whereby heat as well as pressure can be applied to the sheet 21 for curing as well as molding the sheet and forming it to finished condition, size and shape. Naturally, the bolsters 14 and 15 both are of planar shapes and it is desired to maintain a uniform spacing between the bolsters when in the operative position shown in FIG. 2, so that a uniform thickness article can be made from the sheet 21 as initially fed in uncured condition into the hydraulic press for molding and/or curing action therein.

FIG. 3 of the drawings illustrates in somewhat exaggerated form how the two rams 20 can cause a bowing or upward curvature of the movable bolster 15 when a relatively small or non-alongate sheet of material 22 of any suitable composition is positioned between the bolsters 14 and 15 for article forming action. The drawing clearly shows that opposed end portions of the movable bolster 15 will be bowed up towards the top bolster 14 in the apparatus as shown in exaggerated form in the drawing.

In the product gauge control system or apparatus of the invention, a modified press 30 is shown in FIG. 4, and in this instance, the press 30 has a fixed or top bolster 31 and a movable bolster 32 positioned therein and with the positioning of the movable bolster 32 being controlled by means of a pair of ram and cylinder means. Such means include cylinders 33 and rams 34 operatively engaging the movable bolster and with the cylinder 33 being secured to a suitable section of any conventional frame 35 provided for the hydraulic press 30. A control hydraulic cylinder 36 and 37 is shown operatively secured as by a base portion thereof to a portion of the frame 35 adjacent and below each end of the movable bolster 32. These cylinders 36 and 37 each have conventional hydraulic control means secured thereto and shown diagrammatically in the drawing for the cylinder 36 whereby a piston 38 received therein can have the position thereof controlled and whereby piston rods or piston extensions 39 and 40 extending from the cylinders 36 and 37 operatively engage or are secured to lower portions of the movable bolster 32 adjacent each end thereof in any conventional manner. In operation of the hydraulic press 30, an upwardly exerted pressure, as indicated by the arrows 41, is exerted on the movable bolster 32 and in this instance, when a relatively short sheet of material 42 is positioned between the bolsters 31 and 32, the bolster 32 would tend to bow upwardly. However, the piston rods 39 and 40 are so controlled and the piston 38, or equivalent, is so actuated that these pistons are exerting balanced downward forces, as indicated by the arrows 43, on opposed end portions of the movable bolster 32. Naturally, the movable bolster has uniformly applied pressures through the hydraulic ram means 34 connecting thereto, whereby substantially balanced forces are exerted on the movable bolster and associated means at all times. The pressures exerted by the cylinder 36 may be controlled in any suitable manner, for example, by a valve 44 connecting to opposite ends of the cylinder by lines 45 and 46. Hydraulic pressure liquid is supplied by a driven pump 47 through a pressure control valve 48 and a supply line 49. Hence, when bowing of the movable bolster tends to occur, the press operator will provide controllable pressure to the cylinders 36 and 37 so as to draw the end portions of the movable bolster downwardly and maintain the bolster flat. The operator of the press 30 can also control the pressures applied by the cylinder 33 and rams 34 to the movable bolster so as to apply sufficient mold, or bolster closing pressure in the press as to overcome the forces in the opposite direction exerted on the movable bolster by the cylinders 36 and 37 and associated pistons or piston rods 39 and 40 whereby the movable bolster will be able to be maintained in planar form when curing or molding relatively short sheets of material in the press.

Yet a further modified press of the invention is indicated by the numeral 50 in FIG. 5. Such press 50 has a top bolster 51 fixedly and operatively secured to strain rods 52 and 53 and equivalent members used in forming a press frame. Obviously, any other top plate or cross member can be provided as a portion of the press frame in addition to the members shown, if desired. A movable bolster 54 is provided within the press 50, which press also has any desired type of a cross or bottom plate 55 provided therein and forming a fixed portion of the press frame.

The particular press shown in FIGS. 5 and 6 has a plurality of ram means 56 provided therein and evenly balanced in relation to the operative area of the movable bolster 53 for forcing the movable bolster into operative pressure article forming engagement with the top bolster 51. A sheet of material 57 is positioned between the bolsters to be cured and/or molded in the press. In this instance, such sheet is relatively short in relation to the length of the bolster 54.

In this particular embodiment of the invention, the article gauge control means and apparatus provided includes a pair of dependent flange plates or sections 60. Such flange plates 60 and 61 are suitably attached to opposed end portions of the movable bolster 53 and extend downwardly of the press any suitable distance so as to avoid interference with actuation of the movable bolster in moving it to and from operative press or curing conditions. So as to counteract the tendency of the movable bolster 53 to bow up at its ends under the article producing conditions as illustrated, a hydraulic cylinder 62 is shown attached to a bar or rod 63 which is fixedly secured to a base portion of the hydraulic cylinder 62 and is fixedly secured to one of the plates 60 extending downwardly from the movable bolster. Then a piston 64 is operatively received in the hydraulic cylinder 62 and has a piston rod 65 extending therefrom. Such piston rod is fixedly secured at its exposed end to the opposite dependent plate 61. Any conventional hydraulic pressure supply means (not shown) connect to conduit supply lines connecting to opposite end portions of the cylinder 62 whereby the piston 64 can be forced to move in either desired direction in the cylinder 62. However, when required, the piston 64 will be forced towards the closed end of the hydraulic cylinder 62 to set up a biasing force in the opposed end portions of the movable bolster 54 to maintain it in flat operative condition when curing the relatively short sheet or article 57 therein. Hence, by control of the pressure supply to the cylinder 62, and to an equivalent cylinder 70 on the opposite side of the bolster, the movable bolster can be maintained in planar form, and an effective gauge control is provided for articles produced in or formed by the press 50.

While the preceding description of the invention describes applications in which the product is shorter than normal, it is obvious that by reversing the deflection curvature of the bolster, and by reversing the direction of applied corrective hydraulic force, the invention also applies to pressing of products which are longer than normal.

The apparatus of the invention is relatively conventional in nature, but is provided in a novel combination relationship with the movable platens or bolsters in the presses so that associated conventional control means can be used for regulating the pressure set up in the various ram and cylinder means used in the press of the invention. Hence, the movable bolster can be maintained in a flat condition even under severe and/or unbalanced pressure applications thereto for article forming and curing actions by forces normally applied at or adjacent the ends of the platen. The platen control rams normally engage it at center areas thereof. By adjustment of the hydraulic pressures used by a press operator, when a relatively short or long sheet is being produced in the press, repetitive article producing conditions can be established and the movable bolsters in the presses be restrained against any bowing or curvature in use. When articles are to be made extending the full operative lengths of the bolsters in the presses, then the pressure supplies for the gauge control means can be shut off, and the presses can be operated in a normal manner. Hence, it is believed that an improved gauge control apparatus for molding and curing presses has been provided and that the objects of the invention have been achieved.

While two complete embodiments of the invention have been disclosed herein, it will be appreciated that modification of these particular embodiments of the invention may be resorted to without departing from the scope of the invention as defined in the appended claims.

What is claimed is:

1. In a hydraulic press for curing or pressing elongate flat articles or sheets therein, a frame means, a fixed bolster extending transversely of said frame means, a movable bolster, and hydraulic ram means engaging said movable bolster to move it to and from operative pressure engagement with said fixed bolster, the improvement of an article gauge control comprising a pair of hydraulic piston and cylinder means operatively connected between said movable bolster and said frame, at corresponding positions adjacent each end of said movable bolster, said piston and cylinder means engaging said movable bolster to produce bending stresses therein biasing end portions thereof away from said fixed bolster whereby said movable bolster is maintained of planar shape and a uniform gauge article can be produced.

2. In a hydraulic press as in claim 1, a plurality of said hydraulic ram means being provided in balanced centralized engagement with said movable bolster, said ram means providing bolster actuating and closing forces sufficient to close said movable bolster into engagement with said fixed bolster and overcome the bolster opening forces provided by said piston and cylinder means.

3. In a hydraulic press for curing, pressing and/or processing elongate flat articles or sheets therein, a frame means, a fixed bolster extending transversely of said frame means, a flat surfaced movable bolster, and hydraulic ram means engaging said movable bolster to move it to and from operative pressure engagement with said fixed bolster, the improvement of article gauge control means comprising pressure producing means operatively connected to said movable bolster at corresponding positions adjacent each end of said movable bolster to produce bending stresses therein biasing end portions thereof away from said fixed bolster whereby said movable bolster is maintained of planar shape and a uniform gauge article can be produced.

4. In a hydraulic press as in claim 3, said pressure producing means comprising end members on said movable bolster extending away from said fixed bolster, and at least one hydraulic piston and cylinder means operatively engaging and extending between said end members to provide expansion forces therebetween to deflect en portions of said movable bolster towards said fixed bolster.

5. In a hydraulic press for curing, pressing and/or processing elongate articles, masses, or sheets therein, a frame means, a fixed bolster extending transversely of said frame means, a flat surfaced movable bolster, and hydraulic ram means engaging said movable bolster at a center area thereof to move it to and from operative pressure engagement with said fixed bolster and/or materials between the bolsters, the improvement of article gauge control means comprising pressure producing means operatively connected to said movable bolster at end portions of said movable bolster to produce bending stresses therein biasing end portions thereof in a direction whereby said movable bolster is maintained of planar shape and a uniform gauge article can be produced when said hydraulic ram means said movable bolster towards said fixed bolster.

References Cited
UNITED STATES PATENTS

| | | | |
|---|---|---|---|
| 3,241,189 | 3/1966 | Siempelkamp | 18—17 |
| 3,343,217 | 9/1967 | Dauberberger | 18—17X |
| 3,381,338 | 5/1968 | Brayman et al. | 18—16 |
| 3,446,879 | 5/1969 | Atkin | 18—16X |
| 3,451,334 | 6/1969 | Hütter | 18—16X |

J. HOWARD FLINT, JR., Primary Examiner

U.S. Cl. X.R.
18—17; 100—214